United States Patent
Kennedy

(10) Patent No.: US 9,288,516 B2
(45) Date of Patent: *Mar. 15, 2016

(54) ALTERNATE SOURCE PROGRAMMING

(71) Applicant: COMCAST CABLE COMMUNICATIONS, LLC, Philadelphia, PA (US)

(72) Inventor: Christopher J. Kennedy, Highlands Ranch, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/263,542

(22) Filed: Apr. 28, 2014

(65) Prior Publication Data

US 2014/0325559 A1 Oct. 30, 2014

Related U.S. Application Data

(63) Continuation of application No. 12/828,502, filed on Jul. 1, 2010, now Pat. No. 8,713,602.

(51) Int. Cl.
| | |
|---|---|
| H04N 7/10 | (2006.01) |
| H04N 21/242 | (2011.01) |
| H04N 21/43 | (2011.01) |
| H04N 21/462 | (2011.01) |
| H04N 21/647 | (2011.01) |
| H04N 21/81 | (2011.01) |
| H04L 29/06 | (2006.01) |
| H04N 21/233 | (2011.01) |
| H04N 21/234 | (2011.01) |

(52) U.S. Cl.
CPC .......... *H04N 21/242* (2013.01); *H04L 65/4076* (2013.01); *H04L 65/602* (2013.01); *H04L 65/80* (2013.01); *H04N 21/233* (2013.01); *H04N 21/234* (2013.01); *H04N 21/4307* (2013.01); *H04N 21/4622* (2013.01); *H04N 21/6473* (2013.01); *H04N 21/8106* (2013.01)

(58) Field of Classification Search
USPC .......... 725/32, 34, 35, 45, 82, 105, 109, 110, 725/112, 131
See application file for complete search history.

(56) References Cited

U.S. PATENT DOCUMENTS

| | | | |
|---|---|---|---|
| 2003/0025832 A1* | 2/2003 | Swart et al. .................. | 348/461 |
| 2004/0117825 A1 | 6/2004 | Watkins | |
| 2007/0118852 A1 | 5/2007 | Calderwood | |
| 2008/0209482 A1 | 8/2008 | Meek et al. | |
| 2008/0320525 A1 | 12/2008 | Smith et al. | |
| 2010/0011405 A1 | 1/2010 | Wu | |
| 2011/0138433 A1* | 6/2011 | Whiteing ...................... | 725/114 |

* cited by examiner

*Primary Examiner* — John Schnurr

(74) *Attorney, Agent, or Firm* — Banner & Witcoff, Ltd.

(57) ABSTRACT

An apparatus, method, and system are provided for associating or tying an audio source/content to visual/video content. A request to tie a selected audio source to visual/video content may be received. Upon receiving the request, the selected audio source may be tied to the visual/video content. Audio received from the selected audio source may be substituted for audio associated with the visual/video content. One or more synchronization techniques/methods may be used to synchronize audio content with visual/video content.

30 Claims, 8 Drawing Sheets

402

| CALL LETTERS | GENRE | PROGRAM(S) | TIED T.V. CHANNEL(S) |
|---|---|---|---|
| WKRZ | CHILDREN'S MUSIC | FAIRY DREAMS (1-4PM) | 5 (2:30-3PM) |
| WNTD | N.D. SPORTS | vs. USC (12:30-4:45PM) | 7 (1-4PM) |

Search: USC

| CALL LETTERS | GENRE | PROGRAM(S) | TIED T.V. CHANNEL(S) |
|---|---|---|---|
| WNTD | N.D. SPORTS | vs. USC (12:30-4:45PM) | 7 (1-4PM) |
| WUSC | EASY-LISTENING | OLDIES (1:45PM-3:45PM) | NONE |
| WYMT | POLITICS | U.S.C. (1-3:30PM) | NONE |

PROGRAM SELECTION: vs. USC (12:30-4:45PM)

| CALL LETTERS | URL | RESTRICTIONS |
|---|---|---|
| WNTD | www.wntdrad.com | SINGLE TELEVISION PER SUBSCRIBER LOCATION, AUDIO AVAILABLE 1/2 HOUR BEFORE GAME, AUDIO TERMINATES 45 MINUTES AFTER GAME |

| T.V. CHANNEL(S) TIE | TIME TIED | CONFIRMED | DELETE |
|---|---|---|---|
| 7 | 1-4PM | YES | YES/NO |
| 6 | 2-3PM | NO | YES/NO |

| CALL LETTERS | GENRE | PROGRAM(S) | TIED T.V. CHANNEL(S) |
|---|---|---|---|
| WKRZ | CHILDREN'S MUSIC | FAIRY DREAMS (1-4PM) | 5 (2:30-3PM) |
| WNTD | N.D. SPORTS | vs. USC (12:30-4:45PM) | 7 (1-4PM), 6 (2-3PM) |

Search: _____

| CALL LETTERS | GENRE | PROGRAM(S) | TIED T.V. CHANNEL(S) |
|---|---|---|---|

Audio Source 1:  WNTD    www.wntdrad.com   Notre Dame vs. USC, college football

Audio Source 2:  WPSU    www.wpsurad.com   Notre Dame vs. USC, college football

Video Source:    Channel 11       ESPN       Notre Dame vs. USC, college football Time Delay Information:

Audio Source 1 is delayed by +2.92 seconds relative to Video.

Audio Source 2 is delayed by +4.55 seconds relative to Video.

Figure 6

ALTERNATE SOURCE PROGRAMMING

CROSS-REFERENCE TO RELATED APPLICATIONS

This application is a continuation of U.S. application Ser. No. 12/828,502, filed on Jul. 1, 2010, titled "Alternate Source Programming", the contents of which are hereby incorporated by reference in its entirety.

FIELD OF ART

The features described herein generally relate to providing users with access to content over a network. More specifically, aspects of the disclosure describe relating visual programming content to one or more audio sources.

BACKGROUND

In a mobile society people often change cities and continue to follow sports teams even after they move. For example, the Chicago Cubs baseball team has a large number of followers/fans throughout the United States. Those fans may prefer to listen to the audio play-by-play as provided by the announcers affiliated with the Cubs, as opposed to coverage that might otherwise be provided by a national network or broadcasting company.

Many people may not be able to watch their favorite team (e.g., the Chicago Cubs) after moving, and are instead only provided with games in a local market. For example, a baseball fan that moved from Chicago to New York City might only be able to watch New York Mets and New York Yankees games. That fan may want to watch a baseball game, but may reluctantly choose to watch a Mets game (as opposed to a Cubs game) due to a lack of Cubs coverage in the New York City market. That fan may have to settle for listening to the Cubs game via (AM) radio, for example. That same fan may also change channels during the Mets game (e.g., during a commercial break of the Mets game) to selectively watch portions of a Yankees game, all the while continuing to listen to the audio play-by-play of the Cubs game. The above setup is cumbersome and impractical in terms of a user experience.

In addition, many big screen high-definition televisions (HDTVs) emit significant radio frequency (RF) noise that interferes with AM radio reception if the radio receiver/antenna is in close proximity to an HDTV, for example. Thus, if the fan has the audio off on a display device (e.g., a television set) and has the radio on, significant interference from the TV may degrade the radio reception.

In recognition of the interference problem described above and other problems, alternative solutions have been proposed. However, there are a multitude of issues and problems associated with each of the proposed solutions as discussed in some examples below.

One issue/problem is the sheer volume of content that a user may wish to access. While the above description has largely focused on baseball, a user may desire access to a large variety of audiovisual content. For example, there are well over one-hundred college football teams in the United States. Most markets do not have enough radio stations to support a local transmission of the audio associated with each of the college football teams. This problem is exacerbated when one considers other types of content and/or programming (e.g., political, financial, arts, movies, talk shows, advertising, etc.) that a user may desire access to.

One proposed alternative solution has been to have groups sponsor out of state events. For example, a group of Cubs fans in New York might sponsor a Cubs game on a New York AM radio station. In this manner, scarce resources are allocated to the highest-valued use. But such sponsorship is costly (especially given the competition/wide variety of programming described above), and free-riders will attempt to enjoy the benefits of (e.g., listen in to) the Cubs game without contributing towards the sponsorship.

Another proposed solution has been to receive the audio as streaming audio over a computer. But most people may not have their computer hooked into their audio system, if they even have an audio system. Moreover, locating a desired audio source is difficult, given the large number of available sources.

Delays or skew between the audio content of a program and the visual content is another major issue. For example, the audio content may be received before television/visual content, thereby presenting challenges in terms of synchronizing the audio to the visual/video content. This synchronization problem was made even worse by the introduction of HDTV, as the visual content of HDTV tends to be even slower than its counterpart under conventional television programming.

Given the above-noted issues and problems, and in conjunction with other issues and problems that will become apparent upon reviewing this disclosure, users continue to seek a better audiovisual programming experience than is currently available.

SUMMARY

This summary is not intended to identify critical or essential features of the disclosure provided herein, but instead merely summarizes certain features and variations thereof.

In some illustrative embodiments, a selection of an audio source may be received. The selected audio source may be tied to or associated with visual content. A connection to the tied audio source may be established. Audio received from the selected audio source may be substituted for audio associated with the visual content responsive to establishing the connection to the audio source.

In some illustrative embodiments, visual/video content may selectively be tied to, or associated with, a Universal Resource Locator (URL) that supplies audio. The supplied audio may be transmitted, received, and played when the visual/video content is selected.

In some illustrative embodiments, in order to tie visual/video content to audio identified by and associated with a URL, one or more applets may be configured to run or execute on a customer premises equipment (CPE) device, such as a set-top box (STB), a personal computer (PC), a gateway, or the like. For example, a first applet (e.g., a set-up applet) may be configured to provide a master control list of available streaming audio sources and one or more restrictions associated with the audio from those sources. The first applet may be configured to support a user selection of an audio source and a selection of one or more visual/video sources to be tied to the audio source. A second applet (e.g., a control applet) may be configured to monitor for a selection of a visual/video source and may invoke a third applet (e.g., a streaming audio applet) in response to determining that the selected visual/video source is present on a user specific control list. The third applet may be configured to receive a URL of an audio source, establish a connection to the audio source, and substitute the audio from the audio source for the audio associated with the selected visual/video source.

In some illustrative embodiments, synchronization between visual/video content and audio content may be obtained. In some illustrative embodiments, a timestamp may be associated with both the visual/video content and the audio content to facilitate delaying one type of content (e.g., visual/video content) relative to the other (e.g., the audio content). In other illustrative embodiments, particularly those where the relative delay between the visual/video content and the audio content is known in advance, the earlier arriving content may be delayed, and such delay may be enforced at a network level, such as at a server, a headend, or at a central location. In still other illustrative embodiments, a delay of one content type (e.g., the audio content) relative to another (e.g., the visual/video content) may be effectuated at a client site (e.g., at a home) via a customer premise equipment (CPE) device, such as a set-top box (STB) or other client-side device via a calibration technique.

Other details and features will also be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings and in which like reference numerals refer to similar elements.

FIGS. 3 and 4A-4C illustrate user interfaces in accordance with one or more aspects of this disclosure.

FIG. 6 illustrates a display screen in accordance with one or more aspects of this disclosure.

DETAILED DESCRIPTION

It is noted that various connections between elements are discussed in the following description. It is noted that these connections are general and, unless specified otherwise, may be direct or indirect, wired or wireless, and that the specification is not intended to be limiting in this respect.

Figure 1:
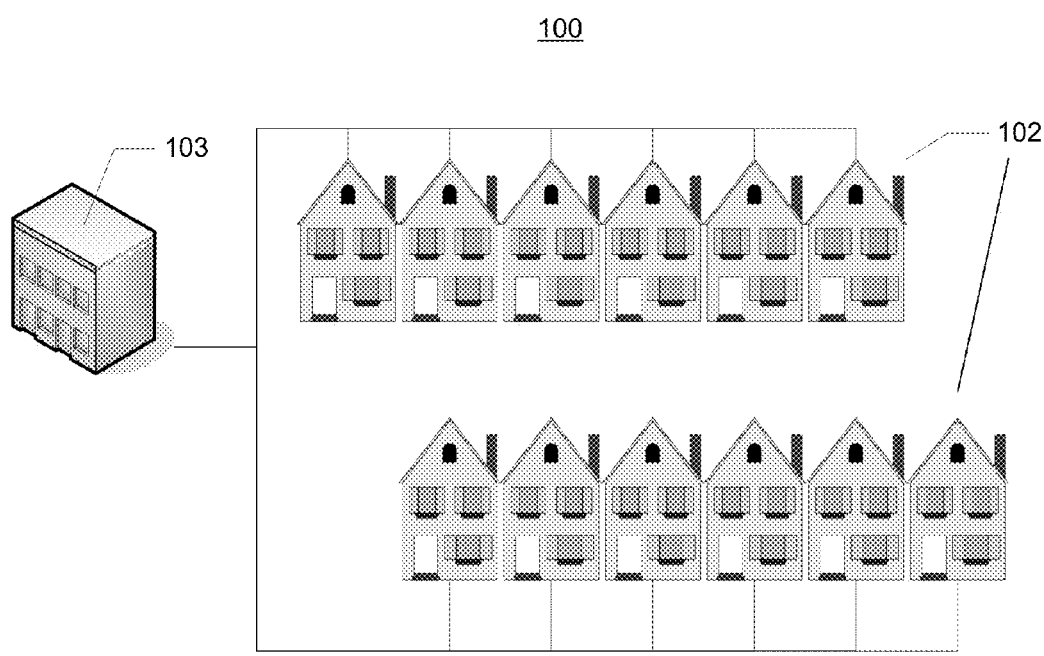
FIG. 1 illustrates an example content distribution system.

FIG. 1 illustrates an example content distribution network 100 on which many of the various features described herein may be implemented. Network 100 may be any type of information or content distribution network, such as satellite, optical fiber, coaxial cable, telephone, cellular, wireless, etc. The network may be a hybrid fiber/coax distribution network found in many television networks. Such networks 100 may use a series of interconnected lines 101, such as coaxial cables, to connect remote sites such as multiple homes 102 to a provider's central location 103. The central location 103 may transmit downstream content, control, and/or information signals onto the lines 101, and each home 102 may have a device to receive and process those signals. Signals exchanged over lines 101 may include upstream transmissions from homes 102 to central location 103.

The lines 101 may be a series of interconnected lines of different type, such as optical fiber and/or coaxial cables, or may be implemented via wireless links. There may be one line originating from the central location 103, and it may be split a number of times to distribute the signal to various remote sites such as homes 102 in the vicinity (which may be many miles) of the central location 103. The lines 101 may include components not illustrated, such as splitters, filters, amplifiers, etc. to help convey the signal clearly. Portions of the lines 101 may also be implemented with fiber-optic cable, resulting in a hybrid fiber/cable (HFC) network of lines 101. By running fiber optic cable along those portions, signal degradation in those portions may be significantly minimized, allowing a single central location 103 to reach even farther with its network of lines 101 than before.

Figure 2:
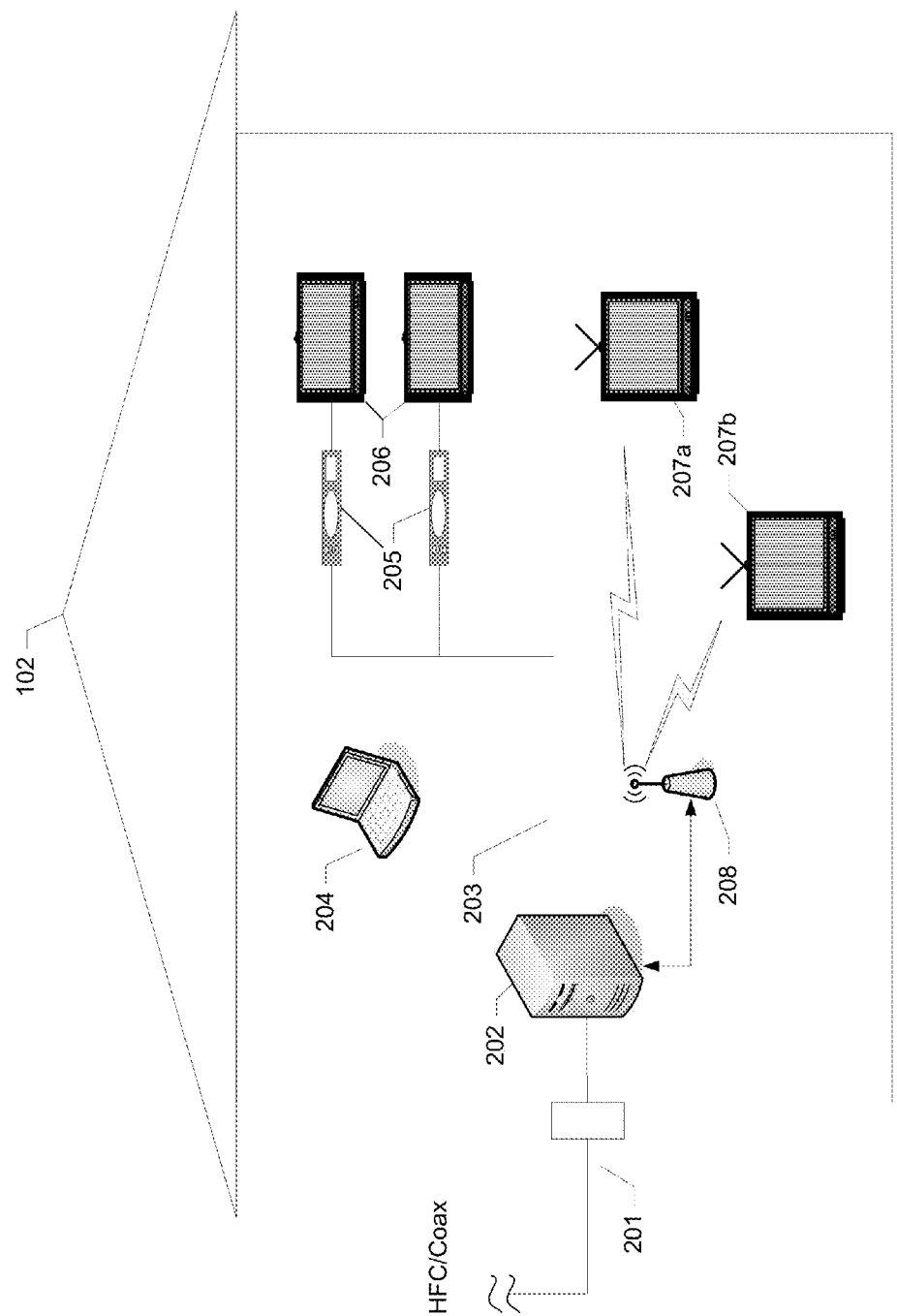
FIG. 2 illustrates an example architecture, with a closer level of detail on one of the premises illustrated in the FIG. 1 network.

FIG. 2 illustrates a closer view of one of the remote sites, home 102 from FIG. 1. As illustrated, the home may be connected to the network 100 by, for example, a wireless optical fiber or coaxial cable feed 201. The feed may be connected to a gateway device 202, which may serve as an interface between the devices within the home 102, and the external devices out on the network 100. The gateway itself may include tuners, modulators, demodulators, etc. to communicate out on the network 100, and may also include interface components to communicate with the devices in the home.

As for the network in the home, the specific types of components may vary, depending on the type of communication network used in the home. One example may be an Internet Protocol network 203 carried over the home's internal coaxial wiring under the MoCA (Multimedia Over Coax Alliance) standard. To this end, the gateway 202 may be an IP transport gateway, using IP communications to communicate with the devices in the home, and with devices outside the home (e.g., via a DOCSIS CMTS in a HFC-type network, for example). Other networks, such as wireless networks, may alternatively be used.

Various devices may communicate on the network in the home. For example, one or more personal computers 204 may use the gateway 202 to communicate with other devices on the Internet. Customer premises equipment (CPE) 205, such as set-top boxes (STBs), may receive distribution of video content received at the gateway 202, and convert that video content into a format suitable for display on corresponding display devices 206, such as televisions, monitors, handheld devices, etc. Alternatively, display devices 206 may incorporate functionality of premises equipment 205. For example, the CPE 205 may receive an MPEG2 stream of video, and may process that stream to generate an HDMI (High Definition Multimedia Interface) output signal to each CPE 205 or corresponding display device 206. While STBs are discussed, one skilled in the art would appreciate that devices in addition to, or in lieu of STBs, such as personal computers (PCs), servers, gateways, etc., may be used in some embodiments.

Some display devices in the home, however, might not have their own CPE, such as a STB. Or they might not have the circuitry needed to decode the MPEG2 stream of video received at the gateway 202. For example, display devices such as televisions 207a and 207b might be old-fashioned analog televisions, having tuners configured to tune to the analog broadcast channels defined by the NTSC (National Television System Committee). Or they may be digital televisions not equipped to receive and decode the latest form of digital compression or modulation used on the network 100. To support such legacy devices, the gateway 202 may include a local wireless transmitter 208.

The local wireless transmitter 208 may be configured to transmit a low-power radio frequency channel carrying video signals of a selected program for local reception within the home. For example, if the television 207a is an analog television, the gateway 202 may use the transmitter 208 to transmit a selected program as an NTSC video signal on an NTSC Channel (e.g., channel 2). That channel and signal can be tuned by the television 207a, and displayed for the user's consumption. In this manner, legacy devices may continue to be used even if transmission techniques advance. The transmitter 208 may use any desired wireless format, such as IEEE 802.11, ZIGBEE, BLUETOOTH, etc. An 802.11 transmitter 208 may be especially useful, since the 2.4 GHz range of that standard happens to overlap the 300 MHz-3 GHz frequency range of the NTSC UHF channels.

Figure 3:
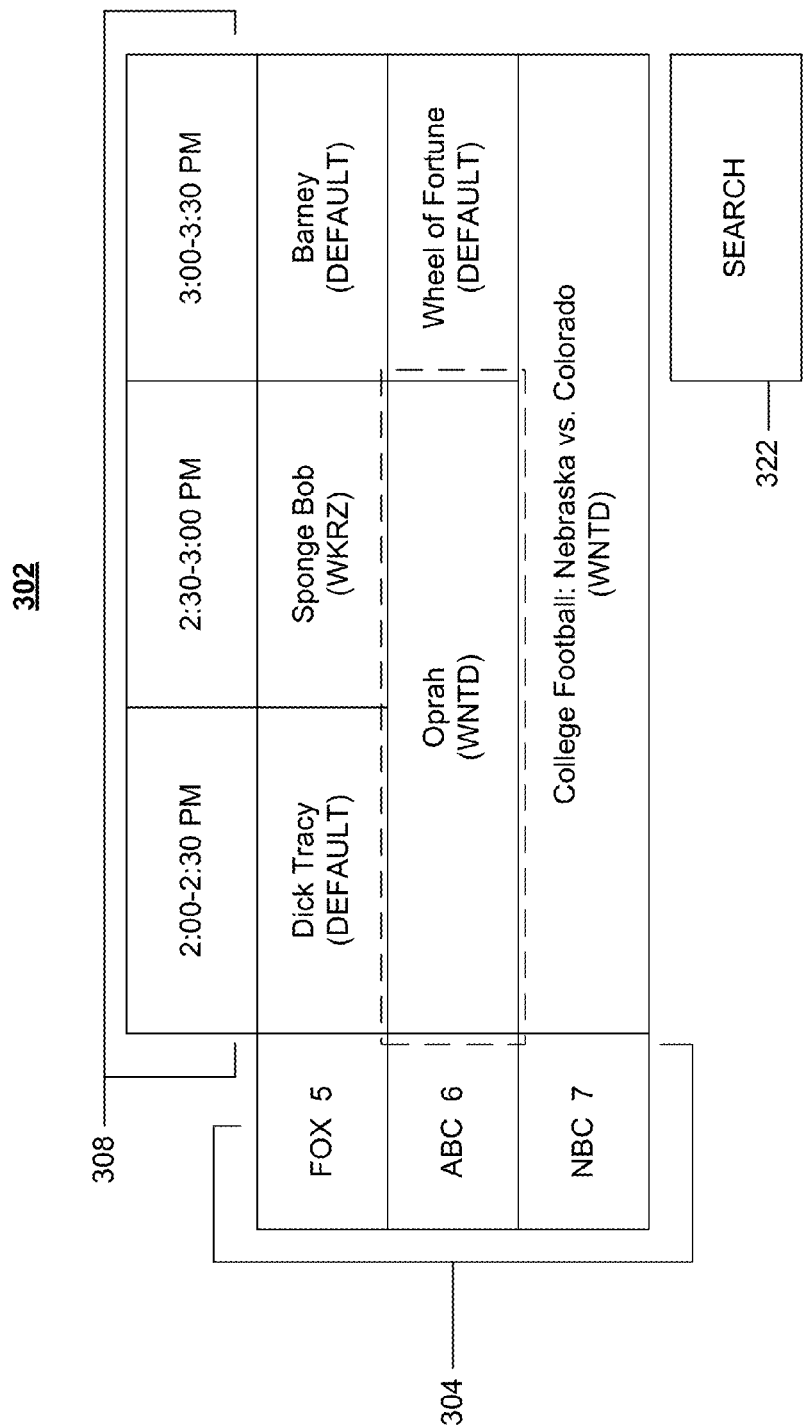

FIG. 3 illustrates a user interface 302 that may be presented on a display device in some embodiments. For example, user interface 302 may be presented on a display device associated with, or coupled to, a personal computer 204, a CPE 205, a television 206, 207a, 207b, and/or the like, optionally within a home 102. User interface 302 may be displayed in conjunction with one or more executing or running (Java) applets, such as the applets described herein. User interface 302 may include an electronic programming guide (EPG), an interactive programming guide (IPG), or the like.

User interface 302 may include a listing of program/content channels 304 and times 308. For example, as shown in FIG. 3, user interface 302 includes content channels 304 corresponding to channels 5-7. Networks affiliated with each of the content channels 304 are also shown (e.g., FOX is affiliated with channel 5, ABC is affiliated with channel 6, and NBC is affiliated with channel 7) in this illustrative example. Programs/content (e.g., Dick Tracy, Sponge Bob, Barney, Oprah, Wheel of Fortune, and College Football: Nebraska vs. Colorado) may be correlated to the content channels 304 for various points in time 308. For example, the user interface 302 displays the correlation between content and channels 304 over the time frame 308 from 2:00-3:30 PM. The content channels 304 and time frame 308 shown in FIG. 3 is illustrative. In some embodiments, more or less than three content channels may be included and additional or alternative time frames may be available. In an on demand implementation, no specific time frames may be provided.

Each of the programs shown in user interface 302 may be associated with an audio source identified in parentheses ( ). For example, as shown in user interface 302, Dick Tracy, Barney, and Wheel of Fortune are all associated with a default audio source. The default audio source may be indicative of the audio typically associated with each of the given programs as provided by an operator or a content provider. Thus, in these embodiments, the default audio content for the Dick Tracy program may correspond to the audio normally associated with (e.g., normally transmitted with the video corresponding to) Dick Tracy. Similarly, the default audio content for the Barney program may correspond to the audio normally associated with (e.g., normally transmitted with the video corresponding to) Barney, and the default audio content for Wheel of Fortune may correspond to the audio normally associated with (e.g., normally transmitted with the video corresponding to) Wheel of Fortune.

In other embodiments, an audio source may correspond to a user selected audio source that the user wants to hear. Such an arrangement could be used when a user wants to listen to the audio associated with the Dick Tracy program while watching the video associated with Barney and/or Wheel of Fortune, or listen to an alternate version of an audio associated with a particular program, for example.

As shown in the user interface 302, the Sponge Bob program may be associated with an audio source having radio call letters WKRZ. In some embodiments, additional information beyond the radio call letters might be included. For example, if WKRZ is transmitting a children's musical entitled "Fairy Dreams" during the time frame 2:30-3:00 PM, user interface 302 may include one or both the genre (children's musical) and the title of the radio program ("Fairy Dreams") in the Sponge Bob related block. Alternatively, or additionally, if WKRZ is transmitting audio related to the Sponge Bob video, the interface may include the title "Sponge Bob" along with other relevant information. Additional information (e.g., a parental rating, an episode description, etc.) may be included in some embodiments with respect to the programs or audio sources illustrated in FIG. 3.

As shown in FIG. 3, both the Oprah program and the College Football: Nebraska vs. Colorado programs are associated with an audio source having radio call letters WNTD. For example, during the time frame from 2:00 PM to 3:30 PM, the Notre Dame football team may be playing their rival, the University of Southern California (USC) Trojans. A first user, named Harold Husband, may have initially intended to watch, by himself, the Nebraska vs. Colorado college football game on channel 7 while simultaneously listening to the audio broadcast of the Notre Dame vs. USC college football game as provided on WNTD. Harold may have been planning for this afternoon of football in solitude weeks in advance, and may have tied the audio from WNTD to channel 7 in preparation.

Harold's plans may have been foiled when his wife, Wanda, arrived home from work early (e.g., at 1:57 PM) on this day in order to spend more (quality) time with Harold. Wanda, as a second user, may complain to Harold regarding his plans to spend the afternoon watching and listening to college football, and may remove a remote control or other content selection device from Harold's hands. Wanda may believe that an effective compromise could be reached between the two of them by allowing her to watch the Oprah talk show (her program of choice) while still allowing Harold to listen to the audio of the Notre Dame vs. USC college football game as provided by WNTD (or vice versa). As indicated via the dashed box around the Oprah program in FIG. 3, Wanda may use a content selection device (not shown), such as a remote control, to navigate the user interface 302 and tie channel 6 to the WNTD radio stream from 2:00 PM to 3:00 PM (e.g., for the duration of the Oprah program) as described further below. For example, Wanda may navigate user interface 302 using one or more arrow keys (e.g., left, right, up, down), and selections may be made using an "OK," "Select," or "Enter" key on the content selection device. A computer mouse, a computer keyboard, voice recognition/identification-response technology, etc. may be used to facilitate selections in addition to, or in lieu of, a remote control.

FIGS. 3 and 4A-4C illustrate user interfaces that may be used in conjunction with one or more embodiments. User interfaces 302, 402, 424, and 402' may be used to tie one or more audio sources to one or more channels or programs, or content more generally. Continuing the above example, when Wanda and Harold agree to watch the visual/video content of the Oprah talk show from 2-3 PM, while simultaneously listening to the audio content of the Notre Dame vs. USC football game, Wanda may invoke a search function to search for audio coverage of the football game. Wanda may invoke the search function from a displayable icon within user interface 302, such as search icon 322 shown in FIG. 3. Alternatively, a search button or key may be located on a content selection device (or any other control device) or a (drop-down) menu interface (not shown) may be included in user interface 302 to facilitate search functionality.

In response to invoking a search functionality, user interface 402 as shown in FIG. 4A may be presented on a display device. User interface 402 may include a top-half, showing radio station call letters that have previously been tied to video content, such as streamed video or television channels.

For example, prior to Wanda grabbing the remote control device from Harold, the "Fairy Dreams" children's musical as provided by radio station WKRZ from 1-4 PM may have been tied to channel 5 from 2:30-3 PM as shown. Similarly, the audio from the Notre Dame versus USC football game as provided by radio station WNTD from 12:30-4:45 PM may have been tied to channel 7 from 1-4 PM. In some embodiments, additional information (such as the default ties shown in user interface 302) may be included in (the top-half of) user interface 402. Although over the air audio sources such as radio stations are discussed in this example, any audio source may be used, e.g., audio over IP, terrestrial, satellite, etc.

User interface 402 may include a bottom-half to support search functionality. For example, as shown in FIG. 4A, a search field may be included with user interface 402. As shown in FIG. 4A, Wanda may have entered 'U', 'S', 'C' in sequence to serve as a search string in response to Harold protesting to Wanda that he wanted to "listen to the big game against USC." Wanda may have used a (QWERTY) computer keyboard to enter the search string: 'U', 'S', 'C'. Alternatively, Wanda may have used an alphanumeric content selection device, such as a remote control device, to facilitate the entry. In some embodiments, voice capture and recognition techniques may be used for purposes of accepting and decoding the search string. Other search string capture techniques may be used in some embodiments. Once Wanda has finished entering the search string, she may enter an appropriate command (e.g., push a button or key, etc.) to execute a search based on the entered search string.

In response to the entered command, a search may be executed based on the search string. For example, based on the search string "USC", a search may be performed for call letters, genres, and programs that include the letters USC in sequence. The bottom-half of FIG. 4A may include a (sub)set of returned results that match the search string Wanda entered. For example, in addition to the Notre Dame vs. USC football game that is being covered on WNTD (and is currently tied to channel 7 from 1-4 PM as a result of Harold's prior activities), radio station WUSC may be providing some easy-listening oldies music from 1:45-3:45 PM and WYMT may be providing discussion on the history and politics surrounding various provisions of the United States Code (U.S.C.) from 1-3:30 PM. The search functionality may search for any stand alone or combined/multiplexed audio content available, such as over the air, terrestrial, satellite, etc.

As shown in FIG. 4A via the dashed box, Wanda may scroll or navigate the (sub)set of returned results to select an audio program/source of interest (e.g., the Notre Dame vs. USC game covered by WNTD), and may confirm that interest (e.g., by selecting one or more buttons, keys, icons, etc.). In order to constrain the list of candidate audio sources provided in the bottom half of interface 402, in some embodiments the user may enter parameters such as a telephone area code or mailing zip code in order to filter-out those sources outside of an identified calling or mailing area. In another embodiment, a user may enter a genre such as News, Sports, Weather etc. Sub genres may also be entered such as for Sports, the particular type of sport (e.g., college football, NBA basketball, etc.).

In response to indicating her interest in the Notre Dame vs. USC game, user interface 424 as shown in FIG. 4B may be displayed on a display device. As shown in FIG. 4B, user interface 424 may include a top-half that provides additional information on the program of interest. For example, in addition to a Uniform Resource Locator (URL) associated with the selected audio source, restrictions may be displayed regarding use or playback of the audio. As shown in FIG. 4B, the audio provided by WNTD may be restricted to a single display device (or any type of a CPE) within a user location (e.g., a single home 102 of FIGS. 1 and 2) or a mobile location. If the Notre Dame vs. USC football game is expected to take place from 1-4 PM, audio may be restricted from half an hour before the game to facilitate pre-game discussion and forty-five minutes after the game to facilitate a post-game wrap-up. Other information and restrictions may be included in some embodiments. For example, if the service is part of a subscription service, some audio may be limited to higher paying or tiered users or subscribers. Another restriction may entail only providing audio associated with a program/event if the visual/video content of the program/event is being displayed.

User interface 424 may also include a bottom-half that may be used to modify (e.g., add, delete, change) options associated with the selected program (the Notre Dame vs. USC game in this example). As shown in FIG. 4B, the bottom-half of user interface 424 associates the audio for the Notre Dame vs. USC game as provided by WNTD with channel 7 as a result of Harold's prior activity/use, and that association/tie may have already been confirmed by Harold (as indicated by the "YES" entry for channel 7). As a result of Wanda's navigation to the Oprah program in user interface 302 of FIG. 3, a presumption may exist that Wanda wishes to tie the selected audio (e.g., the Notre Dame vs. USC game's audio as provided by WNTD) to the selected program (e.g., the Oprah program as provided on channel 6 from 2-3 PM), and the fields shown in FIG. 4B that tie the audio from the Notre Dame vs. USC football game to channel 6 for the duration of the Oprah Program may be pre-populated as a result in some embodiments. In some embodiments, Wanda may be able to overwrite the pre-populated fields. Once Wanda is satisfied with her selections, she may be able to confirm the tie (which would result in the "Confirmed" status changing from "No" to "Yes" with respect to channel 6 in user interface 424). Wanda could also delete ties using the Yes/No fields associated with the delete option provided in interface 424.

FIG. 4C illustrates how user interface 402' may appear after Wanda confirms the tie between the audio of the Notre Dame vs. USC football game on WNTD and the Oprah program provided by channel 6 from 2-3 PM in conjunction with FIGS. 3 and 4B (e.g., user interfaces 302 and 424, respectively). Relative to user interface 402 as shown in FIG. 4A, user interface 402' of FIG. 4C demonstrates channel 6 (2-3 PM) tied to WNTD.

The user interfaces 302, 402, 424, and 402' described above with respect to FIGS. 3 and 4A-4C are illustrative. Other features or options may be included with the user interfaces in some embodiments. Additionally, one or more of user interfaces 302, 402, 424, and 402' may be included in a single display screen, or split across multiple display screens. In addition to, or as an alternative to, providing a search screen or search functionality to locate an audio source, drag-and-drop techniques may be used to facilitate tying an audio source to visual content. For example, referring to user interface 302, if Wanda saw that WNTD was previously tied to channel 7, Wanda may have been able to point-and-click on (WNTD) associated with channel 7, drag the pointed-and-clicked WNTD selection, and then drop the dragged WNTD selection on top of the Oprah block associated with user interface 302. Such a point-and-click, drag-and-drop technique may be particularly useful in embodiments where an audio source is especially popular or frequently selected.

In connection with user interfaces 302, 402, 424, and 402', one or more (Java) applets may execute at a CPE, such as a set-top box (STB), to facilitate tying an audio source to visual content. For example, a first applet (e.g., a set-up applet) may be configured to maintain and access a master control list of identified streaming audio sources/sites available to a user. The master control list may include a label for audio sources, such as radio station call letters, restrictions, alternate (mirrored) sources that the audio may be available from, and the like. The first applet may be configured to access the master control list, compare restrictions on the list with a current operating environment (e.g., user log-in information, subscriber account/payment information, display device capabilities, etc.) and display audio choices that meet selection and environmental criteria. Responsive to a user selection tying an audio source to visual content, the first applet may be configured to write a pointer to a user specific control list to map the audio source to the visual content for that particular user. The pointer that is written may reference a Uniform Resource Locator (URL) associated with the audio source. In this manner, an entry in the user specific control list may be associated with the selected audio source.

A second applet (e.g., a control applet) may be configured to monitor and detect changes in selected or received visual content, such as a change of channel or a change in content provided via a particular channel. The second applet may be configured to compare the newly received visual content to the user specific control list to determine whether the newly received visual content exists in the user specific control list. If the newly received visual content is referenced by the user specific control list, the second applet may be configured to invoke a third (e.g., streaming audio) applet. Conversely, if the newly received visual content is not referenced by the user specific control list and the third applet was in use (e.g., executing) prior to the change in the received visual content, the second applet may be configured to stop the third applet, terminating a connection with the audio source; in such a situation, a default audio source may be used with the newly received visual content as described above.

The third applet may be configured to extract or receive the URL of the audio source from the user specific control list and establish a connection with the audio source referenced by the URL. The third applet may be configured to substitute the audio from the (streaming, for example) audio source for the audio normally/typically associated with the visual content upon establishing the connection. In some embodiments, a (wireless, for example) receiver may be located at a user site (e.g., home 102) if the received audio corresponds to, e.g., an over the air signal.

While described above in the context of three applets, in some embodiments a different number of applets may be used. The functionality described above with respect to each of the three applets may be shared or located in a single applet, or distributed across more than one applet, in some embodiments. The applets may be located on, and execute within, one or more of a gateway 202, a computer 204, a CPE 205 such as a STB, a display device 206 such as a television, and the like. Alternatively, or additionally, the applets may be located at a server, a headend, or a central location, such as in a provider's system environment.

Figure 5:
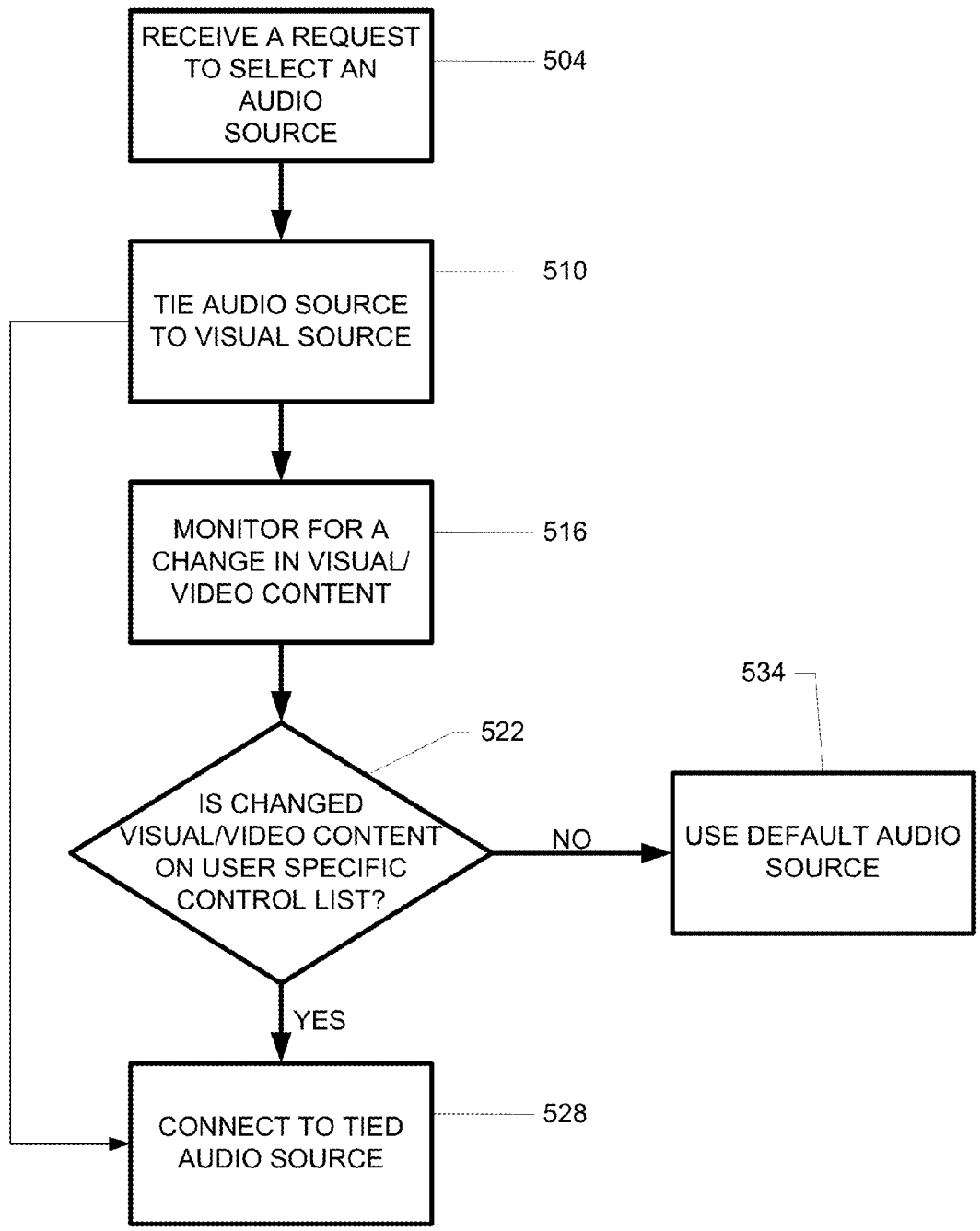
FIG. 5 illustrates a method that may be used in connection with one or more aspects of this disclosure.

FIG. 5 illustrates a method that may be used in conjunction with one or more embodiments of this disclosure. In step 504, a request may be received to select an audio source for tying to one or more visual/video sources, such as a television or program channel. The request may be made using one or more menus or icons from a display screen (e.g., one or more of user interfaces 302, 402, 424, 402' of FIGS. 3 and 4A-4C), a button or key on a content selection devices, such as a remote control device, a computer keyboard, or the like. In some embodiments, a content or service provider may provide audio source recommendations based on a user profile or based on historical selections made by the user in response to step 504. In some embodiments, a list of available audio sources may be displayed on a display device and one or more selections from the list of available audio sources may be made.

In step 510, the selected audio source may be tied to a visual/video source. The tie may be effectuated using a search technique similar to the one described above. Alternatively, where a user knows the audio source in advance, the user may simply enter one or more pieces of information identifying the audio source. For example, the user may enter radio station call letters of the audio source, a URL associated with the source, the name of the radio/audio program, the name of the visual/video source, or the like. The tie may be written as a pointer to a user specific control list as described above, and may include information such as the time duration of the tie and any other restrictions that may be imposed on the tie (whether such restrictions are specified by the user, a network operator/provider, a party responsible for providing the audio or visual/video content, or the like). Once the tie associated with step 510 is established, audio content from the audio source selected in step 504 may be substituted for audio that is normally/typically received with the video source when the video source is selected.

The tie/substitution may take place at one or more components in a network. For example, the tie and/or substitution may occur at a central location (e.g., a server or headend), a customer premise equipment (CPE) device, a display device, or any other device(s).

In some embodiments, a CPE device (or any other device at a client-side location) receiving audio content from the audio source selected in step 504 may continue to receive audio content from an audio source that is typically/normally associated with the visual source. For example, the CPE may include a (separate) receiver configured to receive the audio content from the audio source selected in step 504, while continuing to receive the audio content from the audio source that is typically/normally associated with the visual source using conventional techniques. The receiver may be connected to a packet-switched network, and/or configured to receive wireless signals and/or wired signals from any source. For example, the audio content received from the audio source selected in step 504 may originate from a radio transmitter, a transmitter using Internet-based communication protocols (e.g., Ethernet), cellular or mobile communication transmitters, etc.

In some embodiments, the audio content from the audio source selected in step 504 may be multiplexed or included with the audio content typically/normally transmitted from a central location to the CPE in connection with the visual source. The CPE may include a tuner configured to select the audio content from one source relative to another (e.g., to select audio content from the audio source selected in step 504). For example, in some embodiments, a user selection of an audio source may be stored at the CPE. The user selection may serve as select or control logic in conjunction with a multiplexor/demultiplexor to choose one audio content relative to another. In some embodiments, audio content may include header or tag information to facilitate isolating one audio content relative to another. In some embodiments, non-selected audio content may be discarded of. In some embodiments, non-selected audio content may be saved or stored at, e.g., a server or the CPE, to facilitate later play-back using the non-selected audio content.

In some embodiments, the substitution associated with step 510 may comprise replacing, at a provider's central location or at the CPE, for example, the audio content typically/normally associated with the visual source with the audio content from the audio source selected in step 504. Some of these embodiments may be used to conserve downstream transmission bandwidth, particularly when the CPE does not require the audio content typically/normally associated with the visual source. Isolation techniques similar to those described above may be incorporated in one or more of these embodiments.

Referring back to FIG. 5, in step 516, a server, a gateway device, a personal computer, a CPE such as a set-top box (STB), or any other device may monitor for changes in selected visual/video content. For example, the monitoring may look for changes initiated by a user, such as the user changing a channel on a content selection device (e.g., a remote control device). Alternatively, or additionally, the monitoring may entail determining that different visual/video content is being provided from a currently selected video/visual source (e.g., a currently selected channel), such as when a first program ends and a second program begins.

In step 522, responsive to a change in visual/video content detected in step 516, a comparison may be made between the new visual/video content and the user specified control list to determine whether the new visual/video content is included in, or referenced by, the user specified control list. If the new visual/video content is present in the user specified control list (e.g., the "YES" path is taken out of step 522), a connection may be established with an audio source specified in the user specified control list and the audio from the audio source may be used in connection with the new visual/video source in step 528. Otherwise, if the new visual/video source is not present in the user specified control list (e.g., the "NO" path is taken out of step 522), then a default audio source may be used in step 534.

While steps 516 and 522 were described above in connection with a change in visual/video content triggering a potential change in the audio content received, other triggers may be used in some embodiments. For example, a user may specify that during a first time period (e.g., from 3:00 PM to 3:30 PM), audio content from audio source #1 should be used and during a second time period (e.g., from 3:30 PM to 4:00 PM) audio content from audio source #2 should be used.

The steps of the method described in connection with FIG. 5 are illustrative. In some embodiments, some of the steps may be optional and the method may include steps not shown. For example, as shown via the arrow connecting step 510 to step 528 in FIG. 5, there does not need to be a change in visual/video content to tie an alternate audio source to existing video. Other modifications are within the scope and spirit of this disclosure.

As described above, aspects of this disclosure relate to tying audio sources or content to visual/video sources or content. Given variations between equipment and communications standards/protocols, and the fact that different delays are associated with different networks, it may be desirable to synchronize the visual/video content with the audio content in some embodiments. In the context of a football game, such synchronization may be desirable so that when a punter kicks a football, the sound/audio of the punter's foot striking the football is perceived by a user/viewer to have occurred at the same time that the user/viewer views the punt taking place on a display device (e.g., a television display screen, a computer monitor, etc.).

Synchronization may be obtained using a variety of techniques/methods. In a first synchronization technique, a timestamp may be incorporated into each of the visual/video signals and the audio signals. A buffer or memory device within a customer premises equipment (CPE) device, such as a set-top box (STB), may be configured to store received visual/video signals and audio signals. The CPE may offset or delay the content that is received first (which is typically the audio content) relative to the later arriving content (which is typically the visual/video content) based on the timestamps. Such a synchronization technique may be useful for automatically eliminating dynamic skew between the visual/video content and audio content, albeit at the expense or increased complexity of having to include a timestamp in the signals. Such dynamic skew may be the result of dynamic loads being handled by the various networks responsible for conveying the visual/video content and audio content. This first synchronization technique may also eliminate (network) skew from source to destination, thereby providing point-to-point or end-to-end synchronization.

A second technique that may be used to provide for synchronization may include delaying the earlier arriving content at a server, headend, or central location if the skew or time differential between the content types (e.g., visual/video content and audio content) is known or fixed. Such a technique may minimize the amount of buffer/memory capacity and processing power required in a CPE because the adjustment takes place at the network level or at a network level component, albeit at the potential expense of sacrificing a small degree of accuracy in the presence of dynamic loads or variations in the transmissions from the central location to the CPE. Such a technique may be particularly beneficial for supporting legacy infrastructure, and in particular, CPEs of limited memory capacity.

A third technique that may be used to provide for synchronization may include calibrating the network and network components by way of a CPE. In this technique, a user may initially select a visual/video source and an accompanying audio source. If the audio content arrives prior to the visual/video content, the user may initially listen for an event associated with the programming (such as the sound of a football being struck by a punter's foot in the context of a football game). Upon hearing the audio content associated with the event, the user may push a button or key located on a user interface associated with the CPE or in some other way indicate that the audio/sound associated with the event has taken place, such as via the depression of a button or key located on a remote control device, a selection from a menu, etc. Then, when the later arriving visual/video content arrives and is displayed on a display screen showing the punter kicking the football, the user may push the button or key on the CPE again or using any other technique to indicate the arrival of the visual/video content. In this manner, a coarse calibration of the network and network components can take place, and control over the network/system delays is provided to the user. Stated slightly differently, the coarse calibration technique may allow a user to synchronize audio content with visual/video content based on the user's sensory abilities. In some embodiments, separate keys or buttons may be provided on the CPE in relation to the audio content and the visual/video content to account for the fact that in some embodiments the visual/video content associated with an event may arrive prior to the audio content associated with that same event.

If the coarse calibration technique does not yield satisfactory results, such that the user desires a greater degree of accuracy in synchronization between the audio content and visual/video content, a fine adjustment or fine calibration technique may be used. The fine adjustment/calibration may also be used if the skew between the audio content and the visual/video content does not remain consistent over time, such that a slight adjustment is desired to account for minor differences. The fine adjustment may allow a user to adjust the delay or offset between the audio content and the visual/video content in increments of, e.g., one one-hundredth of a second. Such an adjustment may take place in accordance with a menu interface or user display screen 606 similar to the one shown in FIG. 6. For purposes of FIG. 6, it is assumed that the user is watching the Notre Dame vs. USC college football game on channel 11 (ESPN) while primarily listening to the audio coverage of that game as provided by radio station WNTD, associated with URL www.wntdrad.com. The user may also occasionally want to listen to audio coverage of the Notre Dame vs. USC game as provided by radio station WPSU, associated with URL www.wpsurad.com, and switch between the two (or more) sources during the course of viewing the game.

As shown in display screen 606, the coarse calibration conducted between the first audio source/content and the visual/video content may have resulted in the audio being delayed by 2.92 seconds relative to the visual/video content. Stated in a slightly different way, audio content associated with a selected audio source may have arrived at a CPE 2.92 seconds earlier than the video/visual content associated with a selected visual/video source had coarse calibration not been conducted. The user could navigate the display screen 606 and change the value of 2.92 seconds that was generated as a result of the coarse calibration to a different value to adjust the delay. For example, changing the delay to (+)3.15 seconds may be useful if the sound of the punter striking the ball as heard from the first audio source was still slightly ahead of the visual depiction of the punter striking the football after the coarse calibration took place. A similar calibration procedure could be used to adjust the delay (coarsely calibrated as 4.55 seconds) associated with the audio content originating from the second audio source shown (e.g., radio station WPSU). As one of skill in the art would appreciate upon reviewing this disclosure, a negative value for the delay in display screen 606 may be used to delay the visual/video content relative to the audio sources/content.

The audio and visual/video tying and synchronization apparatuses, systems, and methods described herein may be used in connection with digital video recording (DVR) capture and storage. Users are demanding increased flexibility in terms of when and how they receive programming content. Content providers and network operators may use the apparatuses, systems, and methods described herein to satisfy such long-felt and previously unfulfilled user desires and needs.

The use of radio call letters and radio sources in this description is illustrative. Streaming audio sources in addition to, or in lieu of, radio sources may be used in some embodiments. For example, television communications/sources and the like may be used in some embodiments.

While the above description is largely related to tying one or more alternate audio sources to visual/video content, in some embodiments an opposite tying relationship may be created and maintained. For example, a user may be presented with a plurality of visual/video sources to tie with audio content. For example, different camera angles may be used to shoot or record an event, such as a political speech, yet the user may desire to hear (or only be provided with) the audio coverage as provided by a content distributor, such as CNN and the like. In some embodiments, a user may have the option of choosing both an audio source and a visual/video source.

Although not required, various aspects described herein may be embodied as a method, a data processing system, or as a computer-readable medium storing executable instructions.

Accordingly, those aspects may take the form of an entirely hardware embodiment, an entirely software embodiment, an entirely firmware embodiment, or an embodiment combining software, firmware and hardware aspects. The functionality may be resident in a single computing device, or may be distributed across multiple computing devices/platforms, the multiple computing devices/platforms optionally being connected to one another via one or more networks. In addition, various signals representing data or events as described herein may be transferred between a source and a destination in the form of electromagnetic waves traveling through signal-conducting media such as metal wires, optical fibers, and/or wireless transmission media (e.g., air and/or space).

As described herein, the various methods and acts may be operative across one or more computing servers and one or more networks. The functionality may be distributed in any manner, or may be located in a single computing device (e.g., a server located at a headend or central location, a client computer, etc.). As discussed herein, access to audiovisual content and may be obtained across various televisions, computers and the like, with potential delays imposed in order to achieve synchronization between visual/video content and audio content.

As described herein, the methodological acts and processes may be tied to particular machines or apparatuses. For example, as described herein, a CPE may be used in various embodiments of this disclosure to tie visual/video content to audio content. More generally, one or more computers may include one or more processors and memory storing instructions, that when executed, perform the methodological acts and processes described herein. Furthermore, the methodological acts and processes described herein may perform a variety of functions including transforming an article (e.g., an electronic identification of an audio source) into a different state or thing (e.g., audio tied to a visual/video source/content, optionally with synchronization between the two).

The various embodiments and examples described above are, as stated, merely examples. Many variations may be implemented to suit a particular implementation, and the various features may be combined, divided, rearranged, omitted and/or augmented as desired. The scope of this patent should not be limited by any of the specific examples described herein.

What is claimed is:

1. A method comprising:
    receiving, at a device, a first selection of a video program provided by a content provider via a content distribution network, the video program comprising default audio content;
    receiving a second selection of a substitute audio source;
    receiving a third selection of a duration for use of the substitute audio source;
    receiving substitute audio content from the substitute audio source; and
    substituting the substitute audio content for the default audio content for the duration indicated.

2. The method of claim 1, wherein the substituting the substitute audio content for the default audio content is performed by a network level component.

3. The method of claim 2, wherein the network level component comprises one of a server or a headend.

4. The method of claim 1, wherein the device is a user device and the substituting the substitute audio content for the default audio content is performed by the user device.

5. The method of claim 4, wherein the user device comprises one of a gateway device, a personal computing device, or a display device.

6. The method of claim 4, wherein the receiving the substitute audio content from the substitute audio source is performed by a receiver of the user device.

7. The method of claim 6, wherein the receiver is configured to receive the substitute audio content in one or more of wired signals or wireless signals.

8. The method of claim 1, wherein the substituting comprises multiplexing the substitute audio with the default audio content.

9. The method of claim 8, wherein:
the device is a user device;
the substituting the substitute audio content for the default audio content is performed by the user device; and
the substituting the substitute audio content for the default audio content comprises choosing the substitute audio content using a tuner of the user device.

10. The method of claim 1, wherein the substituting the substitute audio content for the default audio content comprises isolating the substitute audio content relative to the default audio content based on one of header information or tag information included in the substitute audio content.

11. The method of claim 1, further comprising associating the substitute audio source with the video program.

12. The method of claim 11, wherein the associating the substitute audio source with the video program is performed by a network level component.

13. The method of claim 11, wherein the device is a user device and the associating the substitute audio source with the video program is performed by the user device.

14. The method of claim 1, wherein the device is a user device, the method further comprising:
determining that a second video program that includes second default audio content has been received at the user device;
determining that the second video program is associated with a second substitute audio source;
receiving second substitute audio content from the second substitute audio source; and
substituting the second substitute audio content for the second default audio content.

15. The method of claim 14, further comprising:
determining that a third video program that includes third default audio content has been received at the user device;
determining that the third video program is not associated with any substitute audio source; and
causing the third default audio content to be presented with the third video program.

16. A method comprising:
receiving, at a device, a first selection of a first content asset stream;
receiving, at the device, a second selection of a first intermediate time frame between a start time and an end time of the first content asset stream;
generating a recommendation list of a plurality of content asset streams;
receiving a third selection of a second content asset stream from the plurality of content asset streams; and
substituting the second content asset stream for a portion of the first content asset stream during the first intermediate time frame.

17. The method of claim 16, wherein the recommendation list is based, at least in part, on a profile of a user.

18. The method of claim 16, wherein the recommendation list is based, at least in part, on a selection history of content asset streams of a user.

19. The method of claim 16, wherein the substituting comprises associating an entry in a user specific control list with the second content asset stream.

20. The method of claim 16, further comprising:
receiving, at the device, a fourth selection of a second intermediate time frame of the first content asset stream;
receiving a fifth selection of a third content asset stream from the plurality of content asset streams; and
substituting for the second intermediate time frame, the third content asset stream.

21. The method of claim 16, further comprising:
receiving, at the device, a fourth selection of a second intermediate time frame of a third content asset stream;
receiving a fifth selection of a fourth content asset stream from the plurality of content asset streams; and
substituting for the second intermediate time frame, the fourth content asset stream.

22. A method comprising:
receiving, at a device, a first selection of a video program;
receiving, at the device, a second selection of a substitute audio source;
receiving, at the device, a third selection of a duration for use of the substitute audio source;
obtaining substitute audio content provided by the substitute audio source; and
outputting, for the duration selected, the substitute audio content with the video program rather than default audio content associated with the video program.

23. The method of claim 22, wherein the device comprises a user device.

24. The method of claim 23, where the user device comprises one of a personal computing device (PC), a gateway device, a display device, a set-top box (STB), or a handheld device.

25. The method of claim 24, wherein the display device comprises one of a television, a monitor, or a display screen.

26. The method of claim 22, wherein the substitute audio source is associated with one of radio call letters or a uniform resource locator (URL).

27. The method of claim 22, wherein the substitute audio source comprises one of a radio station or a television network.

28. The method of claim 22, wherein the substitute audio source comprises one of a radio frequency channel or a television channel.

29. The method of claim 22, wherein the substitute audio source comprises one of a radio program or a television program.

30. The method of claim 22, wherein the audio source comprises one of an over the air audio source, an audio over IP audio source, a terrestrial audio source, or a satellite audio source.

* * * * *